(12) United States Patent
Steege

(10) Patent No.: US 6,390,718 B1
(45) Date of Patent: May 21, 2002

(54) T-SHAPED CONNECTION FRAME BETWEEN TWO FRAME MEMBERS OF A FACADE OR GLASS ROOF

(75) Inventor: Dieter Steege, Bad Salzuflen (DE)

(73) Assignee: SCHÜCO International KG, Bielefeld (DE)

(*) Notice: Subject to any disclaimer, the term of this patent is extended or adjusted under 35 U.S.C. 154(b) by 0 days.

(21) Appl. No.: 09/484,003

(22) Filed: Jan. 18, 2000

(30) Foreign Application Priority Data

Jan. 18, 1999 (DE) .......................... 199 01 775

(51) Int. Cl.⁷ .................................. F16B 7/04
(52) U.S. Cl. ..................... 403/187; 403/252; 403/297; 403/320
(58) Field of Search ............. 403/187, 199, 403/200, 205, 217, 239, 252, 261, 297, 314, 320, 350, 374.4

(56) References Cited

U.S. PATENT DOCUMENTS

| 3,816,011 A | * | 6/1974 | Biebuyck et al. ......... 403/187 |
| 4,396,241 A | * | 8/1983 | Winn ..................... 403/205 X |
| 4,601,139 A | * | 7/1986 | Esposito ..................... 52/90 |
| 4,641,983 A | * | 2/1987 | Strassle .................. 403/187 X |
| 4,671,027 A | * | 6/1987 | Esposito ....................... 52/86 |
| 4,775,259 A | * | 10/1988 | Shell ........................ 403/252 |
| 4,840,512 A | * | 6/1989 | Rock et al. ............ 403/199 X |
| 4,900,179 A | * | 2/1990 | Kundert ................. 403/217 X |
| 4,907,388 A | * | 3/1990 | Siahatgar ............... 403/252 X |
| 5,224,307 A | * | 7/1993 | Lukos .................... 403/200 X |
| 5,363,625 A | * | 11/1994 | Philippi .................... 52/653.2 |
| 5,461,837 A | * | 10/1995 | Chaney et al. ......... 403/297 X |
| 5,680,737 A | * | 10/1997 | Sheipline ............... 403/205 X |
| 5,687,529 A | * | 11/1997 | Pickering ............... 403/261 X |
| 5,743,670 A | * | 4/1998 | Ader .......................... 403/296 |
| 6,125,606 A | * | 10/2000 | Larsson .................... 52/726.2 |

FOREIGN PATENT DOCUMENTS

DE 38 09 951 A1 10/1989

* cited by examiner

Primary Examiner—Lynne H. Browne
Assistant Examiner—David E. Bochna
(74) Attorney, Agent, or Firm—Henry M. Feiereisen

(57) ABSTRACT

A connection frame for joining two frame members of a facade or glass roof, with the frame members extending perpendicular to one another and having each an interior chamber, includes a joint member so received in the interior chamber of one of the frame members as to extend over a portion of a cross section of the interior chamber. The joint member is securable to an anchoring member which is connected to a wall of the one frame member.

41 Claims, 9 Drawing Sheets

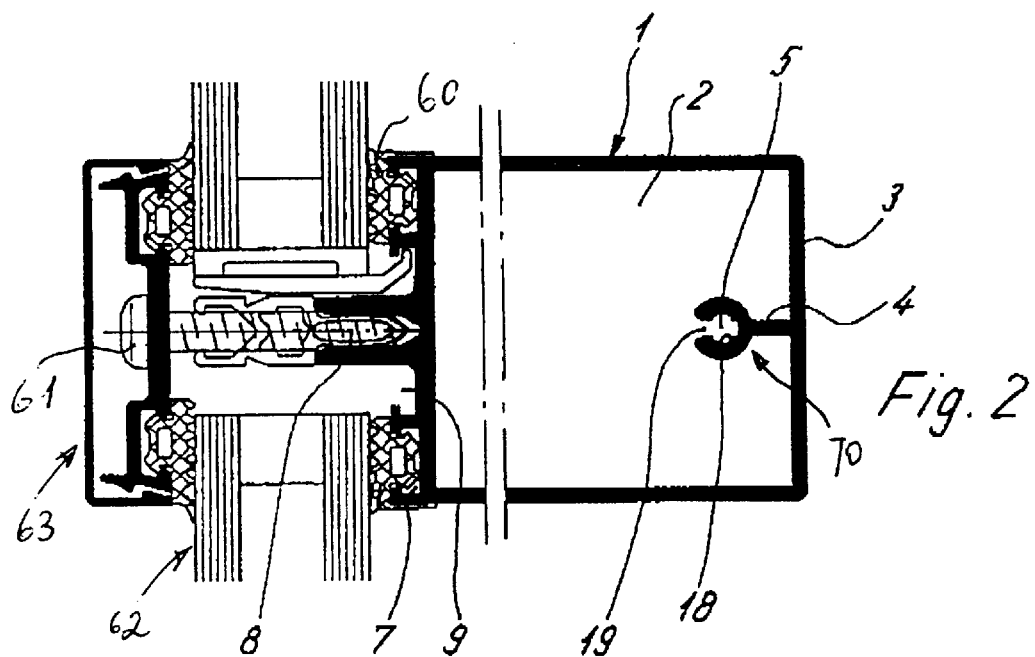
Fig. 2
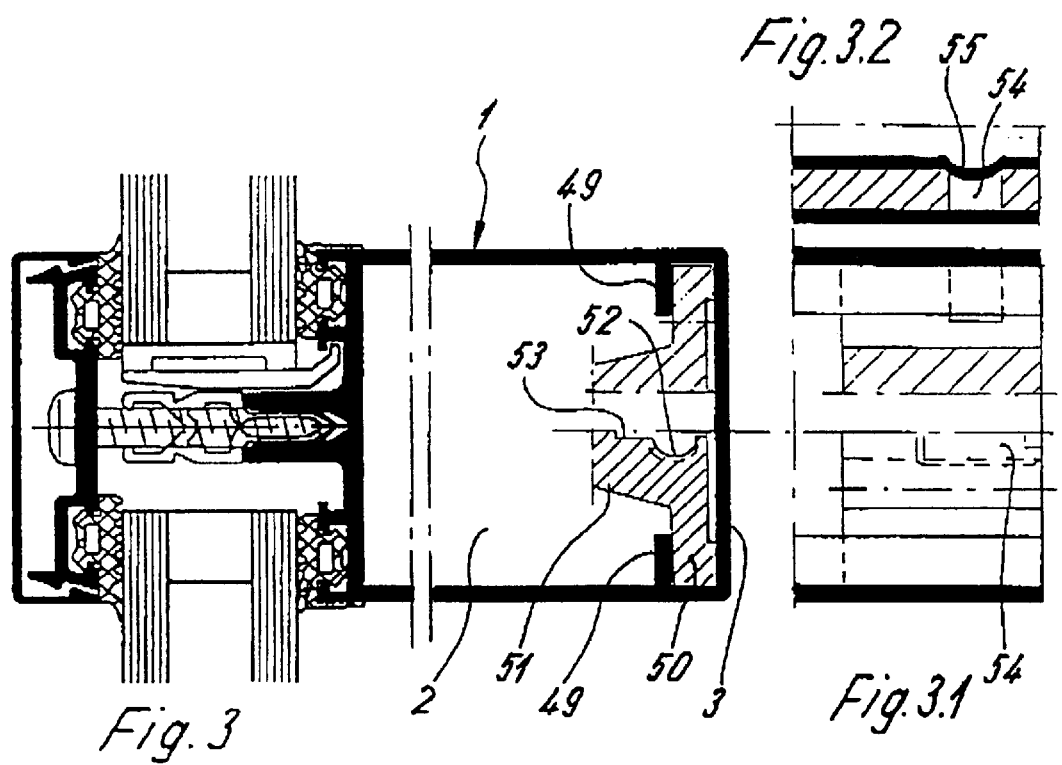
Fig. 3    Fig. 3.1    Fig. 3.2

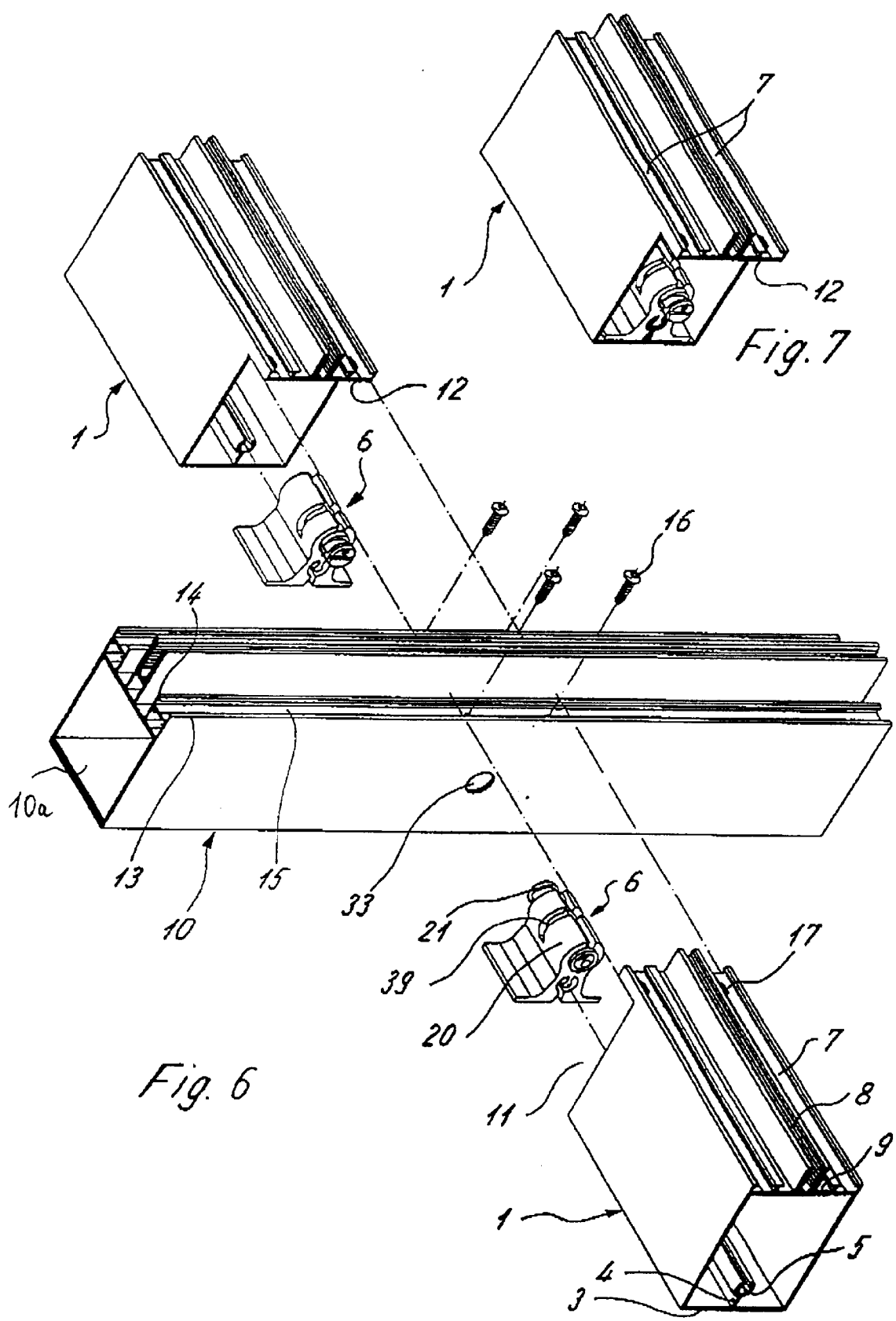

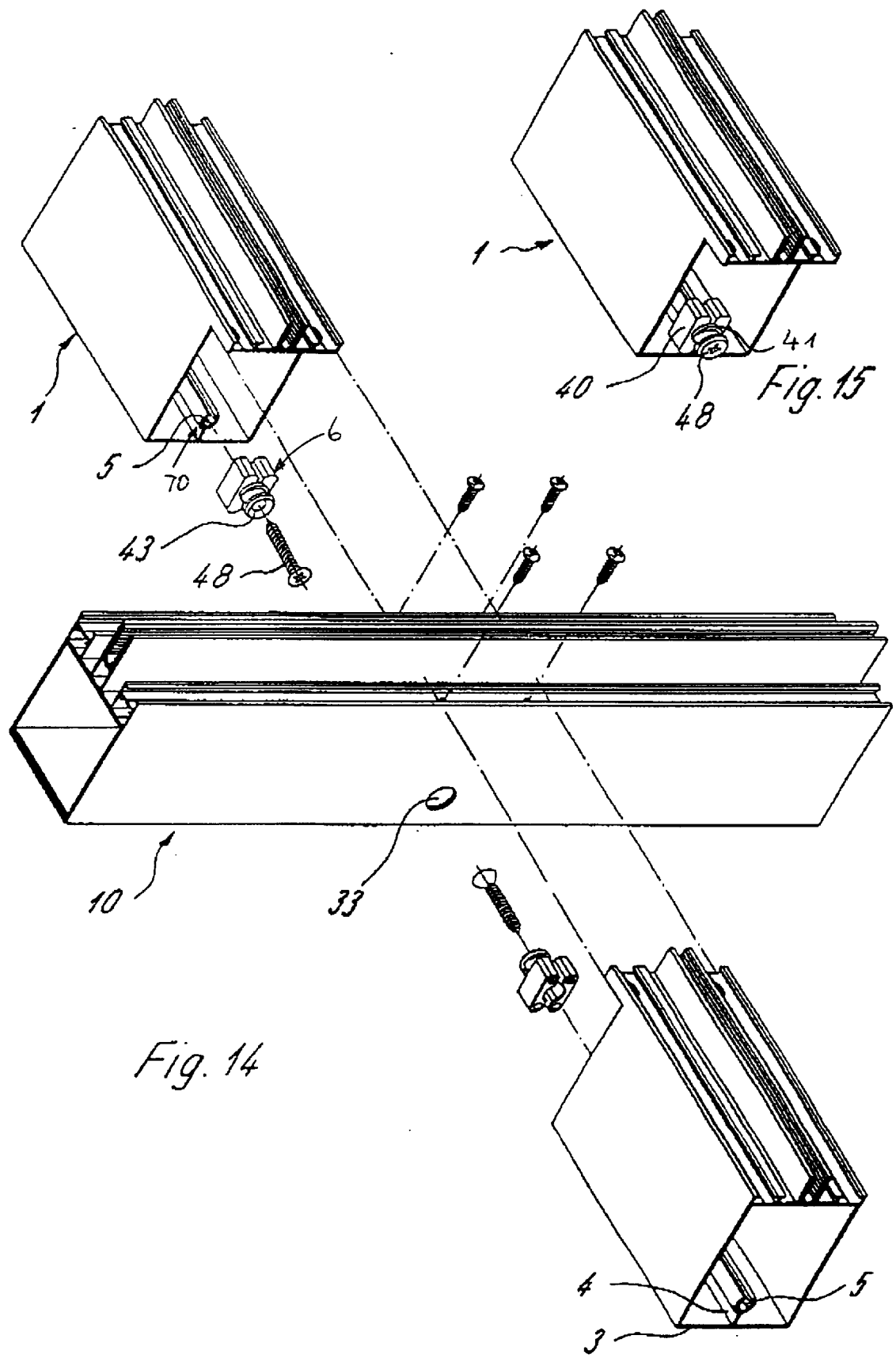

T-SHAPED CONNECTION FRAME BETWEEN TWO FRAME MEMBERS OF A FACADE OR GLASS ROOF

CROSS-REFERENCES TO RELATED APPLICATIONS

This application claims the priority of German Patent Application Serial No. 199 01 775.1, filed Jan. 18. 1999, the subject matter of which is incorporated herein by reference.

BACKGROUND OF THE INVENTION

The present invention relates, in general, to a connecting framework for joining two frame members, such as a crossbeam profile and a post profile of a facade or glass roof, and more particularly to a connection frame in which two frame members are interconnected by a joint member to form a T.

German Pat. No. DE 38 09 951 A1 describes a T-connection frame between a crossbeam profile and a post profile, whereby both profiles have each an interior chamber and are interconnected by a joint member in the form of a U-shaped joint member of light metal which extends across the entire cross section of the interior chamber of the crossbeam profile. The joint member has a toggle lever like bridge between the plate-shaped legs of the joint member and is formed with a threaded bore for receiving a clamping screw which has a head portion bearing against an end face of the joint member. The bridge has a central web part, which is formed with the threaded bore for the clamping screw, and web parts which are connected with the legs and extend at an obtuse angle relative to the legs. After insertion of the joint member through the confronting end of the crossbeam profile, a tightening of the clamping screw causes the legs, which are coated with an adhesive, to be pressed against the facing inner surfaces of the crossbeam profile so as to realize a reliable bond between the plate-shaped legs of the joint member and the crossbeam profile. The joint member further includes a collared bolt which is insertable in the joint member and can be guided through a bore into the interior chamber of the post profile for interconnecting the crossbeam profile and the post profile. As the front end of the collared bolt is provided with an indexing recess, the collared bolt can receive a part of the bore wall in its indexing recess, thereby realizing a form-fitting connection between the collared bolt and the post profile. The collared bolt is supported by a spring and can be inserted in the joint member in opposition to the action of the spring, so long as a crossbar is placed between two mounted post profiles.

This conventional T-shaped connection suffers shortcomings because the joint member extends across the entire cross section of the interior chamber of the crossbeam profile so that crossbeam profiles of varying structural height require different joint members.

SUMMARY OF THE INVENTION

It is thus an object of the present invention to provide an improved T-shaped connection frame, obviating the afore-stated drawbacks.

In particular, it is an object of the present invention to provide an improved T-shaped connection frame which is so configured as to allow use of a same joint member for crossbeam profiles irrespective of the cross section of their interior chamber.

These objects, and others which will become apparent hereinafter, are attained in accordance with one aspect of the present invention by providing a joint member for interconnecting two frame members in the form of a T, whereby the joint member is a formed body which is so received in the interior chamber of one of the frame members as to extend only across part of a cross section of the interior chamber and destined to engage in the interior chamber of the other one of the frame members, whereby the formed body is securable to an anchoring member arranged adjacent an outer wall of the one of the frame members, with the outer wall extending in parallel disposition to a glass panel plane.

According to another feature of the present invention, the formed body of the joint member may be made of light metal sections, die casting sections. extruded sections, or plastic material. Examples include cast aluminum, cast aluminum alloy, injection-molded plastic material, e.g. of polyamide or PVC. optionally reinforced with fiber (e.g. carbon reinforced, plastics reinforced and/or glass fiber reinforced).

The anchoring member extending at or near the outer wall of the interior chamber may include an arm and an anchoring receptacle formed in one piece with the arm and defining a bore for receiving a screw fastener, or may be designed as a boundary web of an anchoring groove.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

FIG. 2 is a sectional view of a modified crossbeam profile of FIG. 1 in conjunction with an insulating glass panel and cover strip;

FIG. 3 is a sectional view of a second embodiment of a crossbeam profile having incorporated therein a variation of a joint member according to the invention;

FIGS. 3.1 and 3.2 are cutaway views of the crossbeam profile of FIG. 3 to show structural details;

FIG. 6 is a perspective view, in exploded illustration, of two T-shaped connections between crossbeam profiles and a post profile by means of an another variation of a joint member according to the invention;

FIG. 7 is a perspective view of the joint member of FIG. 6 in assembled state inside a crossbeam profile;

FIG. 14 is a perspective view, in exploded illustration, of two T-shaped connections between crossbeam profiles and a post profile, showing in detail yet another variation of a joint member according to the invention;

FIG. 15 is a perspective view of the joint member of FIG. 14 in assembled state inside a crossbeam profile;

DETAILED DESCRIPTION OF PREFERRED EMBODIMENTS

Figure 1:
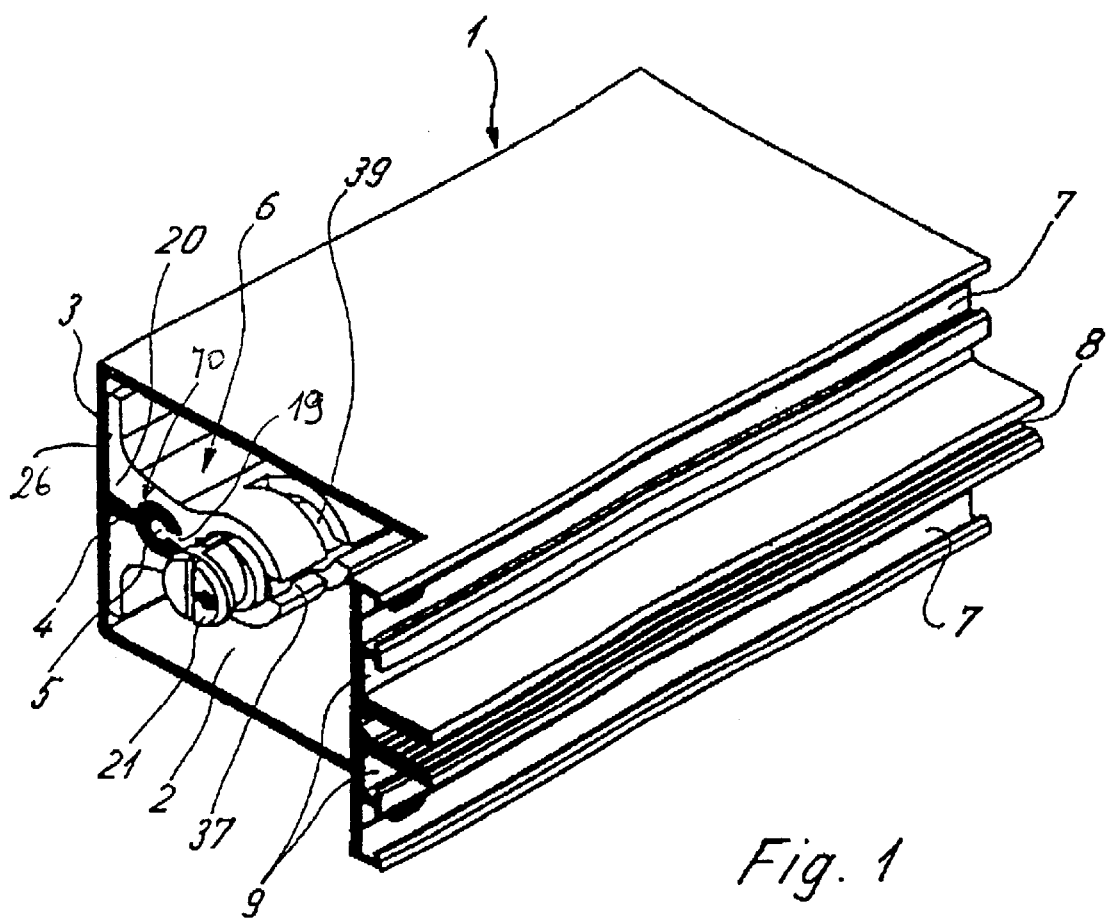
FIG. 1 is a perspective, fragmentary view of a T-shaped connection frame according to the present invention, showing in detail a first embodiment of a crossbeam profile having incorporated therein a joint member according to the invention.

Throughout all the Figures, same or corresponding elements are generally indicated by same reference numerals.

Turning now to the drawing. and in particular to FIG. 1, there is shown a perspective. fragmentary view of a T-shaped connection frame according to the present invention, showing in detail a first embodiment of a crossbeam profile, generally designated by reference numeral 1 for attachment to a post profile 10 (cf. FIG. 6). It will be appreciated by persons skilled in the art that the present invention should not be restricted to the connection of a crossbeam profile and a post profile of a facade or glass roof, as the principles described in the following description with respect to a crossbeam profile are generally applicable to connection frames for joining two frame members to form a T.

As shown in FIG. 1. the crossbeam profile 1 has incorporated therein a joint member, generally designated by reference numeral 6 for joining the crossbeam profile 1 to the post profile 10 via a collared bolt 21, as will be described further below. The crossbeam profile 1 defines an interior chamber 2 and includes an anchoring member which is generally denoted by reference numeral 70 and extends across the entire length of the crossbeam profile 1 for attachment of the joint member 6 at one end face of the crossbeam profile 1 confronting the post profile 10. The anchoring member 70 includes an arm 4, which extends inwardly from an outer wall 3 of the crossbeam profile 1 into the interior chamber 2, and an anchoring receptacle 5 which is formed in one piece with the arm 4. The anchoring receptacle 5 has a substantially round configuration and is formed at its arm-distal apex with a longitudinal slot 19.

Externally, the crossbeam profile 1 is formed along the margins with anchoring grooves 7 for receiving beads 60 (FIG. 2) of sealing material. In a central location, the crossbeam profile 1 includes a web 8 which is formed with a threaded bore for receiving screw fasteners 61. Extending on both sides of the web 8 between the web 8 and the anchoring grooves 7 are gutters 9 for percolating water.

The crossbeam profile 1 is formed on its end face confronting the post profile 10 of the facade or glass roof with a recess 11, thereby defining a bottom surface 12 (cf. FIG. 7). As shown in FIGS. 6 and 7, the post profile 10 defines an interior chamber 10a and is formed with an external anchoring groove 15 which is bounded by spaced apart confronting skirts 13, 14 and provided for receiving a bead of sealing material. Upon joining the profiles 1, 10, the bottom 12 of the crossbeam profile 1 is placed upon the skirts 13, 14 and secured by screw fasteners 16 which are guided through bores 17 of the crossbeam profile 1 into aligned bores of the post profile 10.

FIG. 2, which shows a sectional view of a modified crossbeam profile 1 in conjunction with an insulating glass panel 62 and cover strip 63, indicates that the crossbeam profile 1 can have variable dimensions. The anchoring receptacle 5 has a substantially round cross section and is formed interiorly with projections 18 which extend inwardly from the wall of the anchoring receptacle 5 and extend across the entire length thereof. The provision of such projections 18 facilitates engagement of a screw and tapping of a thread in the wall of the anchoring receptacle 5.

As a consequence of the securement of the anchoring receptacle 5 via the arm 4 to the outer wall 3 of the crossbeam profile 1, which outer wall 3 is in parallel disposition to the glass pane plane, there is sufficient space available for the joint member 6 when being attached to the anchoring member 70 as shown in FIG. 1, whereby the anchoring receptacle 5 is used for form-fitting and force-fitting fixation of the joint member 6.

Since after attachment of the crossbeam profile 1, the anchoring receptacle 5 bears with its end face upon a wall of the post profile 10, it is possible, when using a longitudinally split post, provided with an expansion joint, to utilize the anchoring receptacle 5 for direct bolting of the crossbeam profile 1 with the post profile 10.

Figure 12:
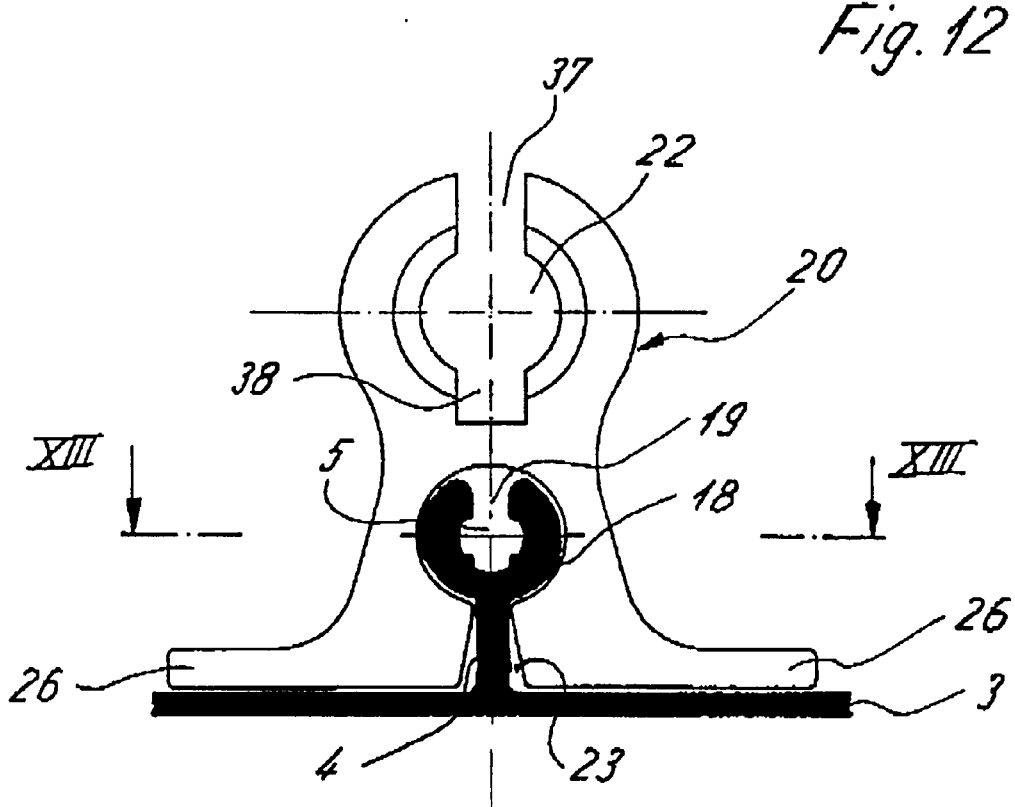
FIG. 12 is a plan view of the joint member of FIG. 1 attached to an anchoring receptacle.
Figure 13:
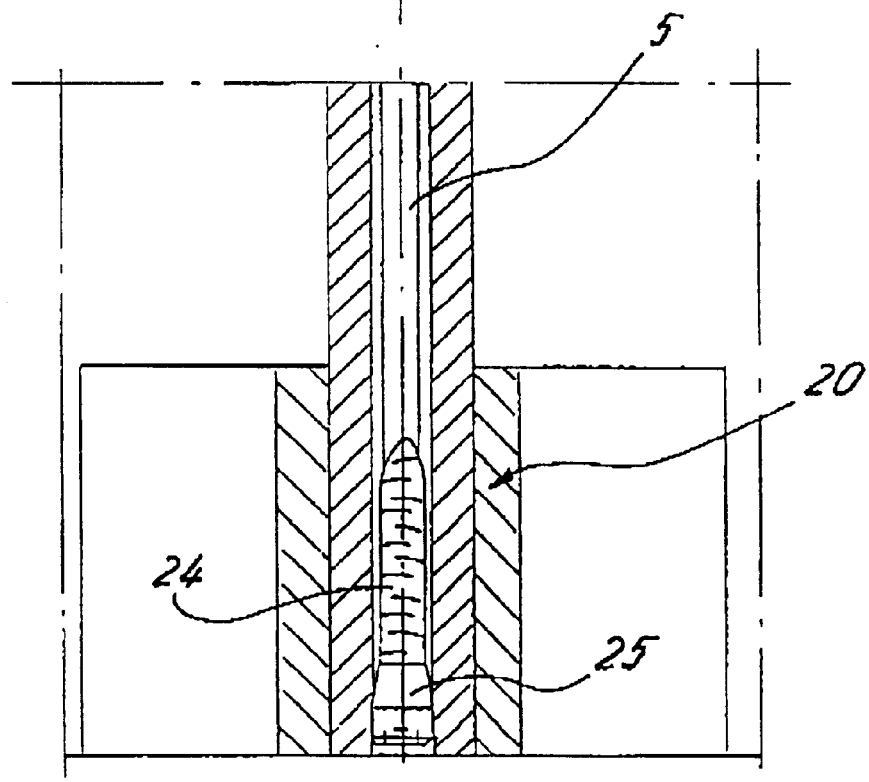
FIG. 13 is a sectional view of the joint member of FIG. 12, taken along the line XII—XII in FIG. 12.

FIGS. 12 and 13 show in more detail the attachment of the joint member 6 to the anchoring member 70 of FIG. 2. The joint member 6 includes a formed body 20 which has a pocket 22 for slidingly receiving the collared bolt 21. The formed body 20 of the joint member 6 may be made of light metal sections, die casting sections, extruded sections, or plastic material. Examples include cast aluminum, cast aluminum alloy, injection-molded plastic material, e.g. of polyamide or PVC, optionally reinforced with fiber (e.g. carbon reinforced, plastics reinforced and/or glass fiber reinforced).

The formed body 20 is further formed with a recess 23 which has an inner contour that complements the outer contour of the anchoring member 70, i.e. the outline of the anchoring receptacle 5 and the arm 4. The formed body 20 is pushed for two-dimensional attachment onto the anchoring member 70 and secured in force-fitting manner, when occupying the end position shown in FIG. 1, by means of a threaded pin 24 which is inserted into the anchoring receptacle 5. As shown in FIG. 13, the threaded pin 24 is formed with a conical section 25 near the actuation end to realize an outward expansion of the walls of the anchoring receptacle 5 and thereby press the anchoring receptacle 5 in force-fitting manner against confronting surfaces of the formed body 20.

The formed body 20 is provided with bottom plates 26 for support against the inside surface of the wall 3, as shown in FIG. 1.

Figure 10:
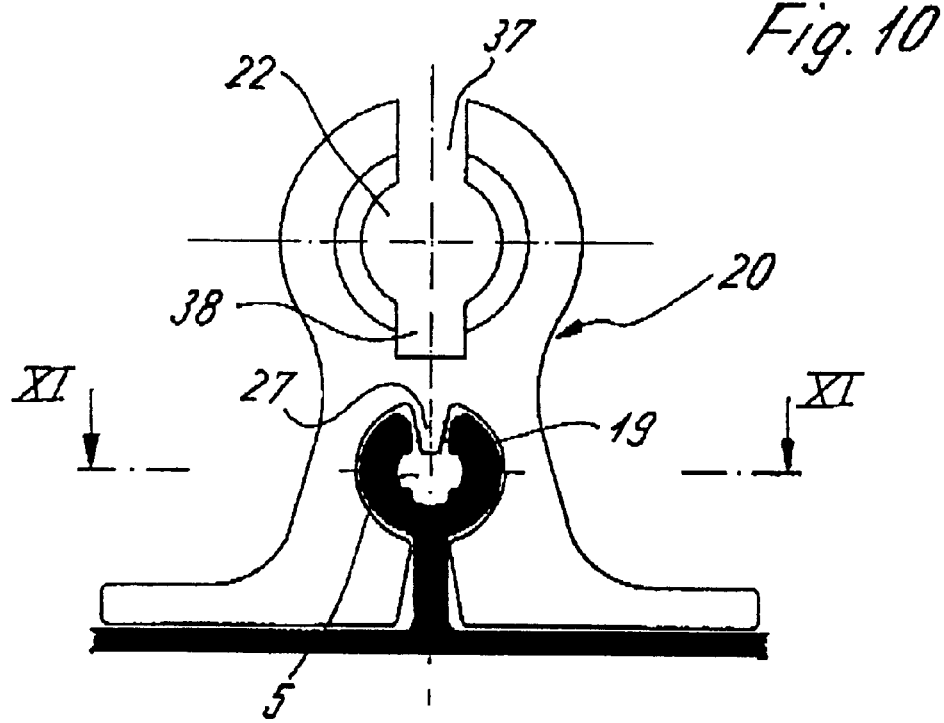
FIG. 10 is a plan view of still another variation of a joint member attached to an anchoring receptacle.
Figure 11:
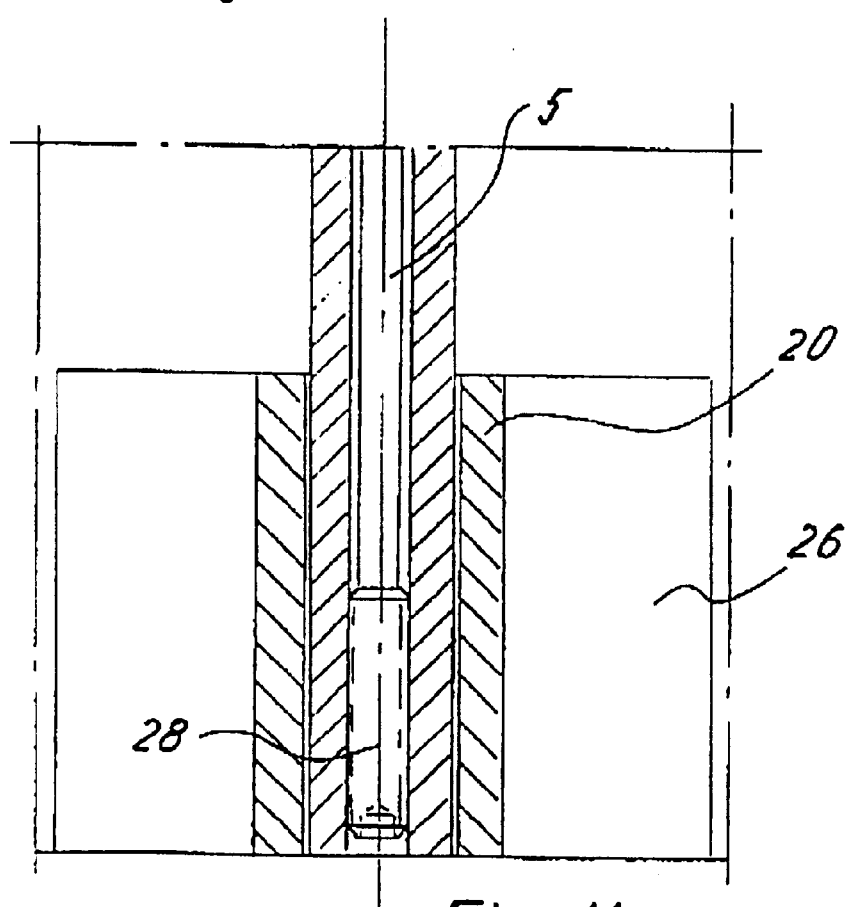
FIG. 11 is a sectional view of the joint member of FIG. 10, taken along the line XI—XI in FIG. 10.

Turning now to FIGS. 10 and 11, there are shown a modification of the formed body 20 of the joint member 6, with the difference residing in the formation of a flange 27 which engages the longitudinal slot 19 of the anchoring receptacle 5 and extends into the interior thereof. Insertable in the anchoring receptacle 5 is a threaded pin 28 which impresses a thread not only in the side walls of the anchoring receptacle 5 but also in the terminal area of the flange 27, thereby securing the anchoring member 70 and the formed body 20 in a form-fitting manner.

Figure 8:
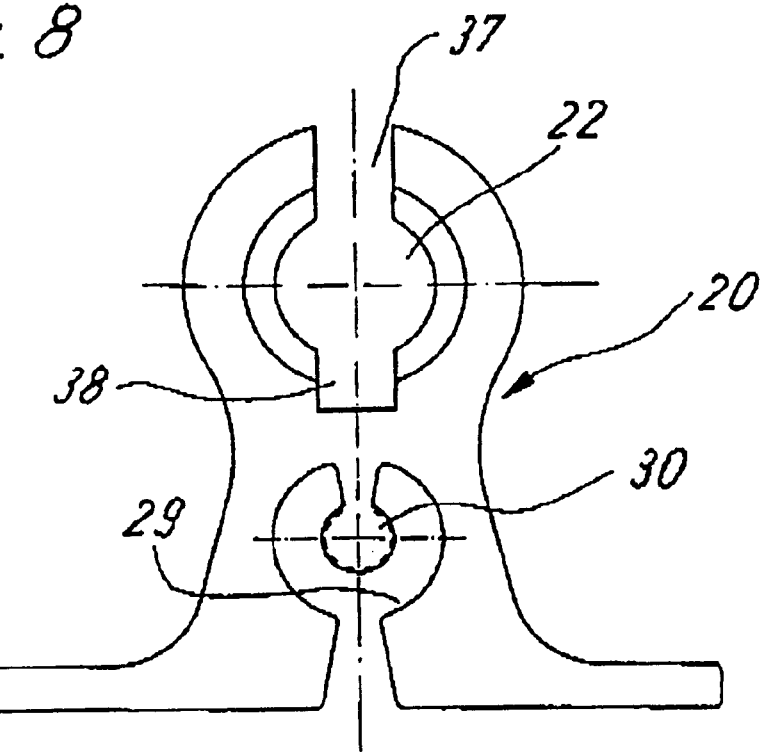
FIG. 8 is an elevational view the joint member of FIG. 6.

FIG. 8 shows another modification of the formed body 20 of the joint member 6, with the difference residing in the formation of a recess 29 which has a contour that corresponds to the contour of the arm 4 and the anchoring receptacle 5 of the anchoring member 70 and thus receives the anchoring member 70 in a form-fitting manner. The formed body 20 of FIG. 8 is further provided with a bulbed, central flange 30 which is insertable into the anchoring receptacle 5. The flange 30 has a conical configuration and tapers toward the insertion end. By forcing the flange 30 into the anchoring receptacle 30, the formed body 20 is secured in a force-fitting manner in the crossbeam profile 1.

Figure 9:
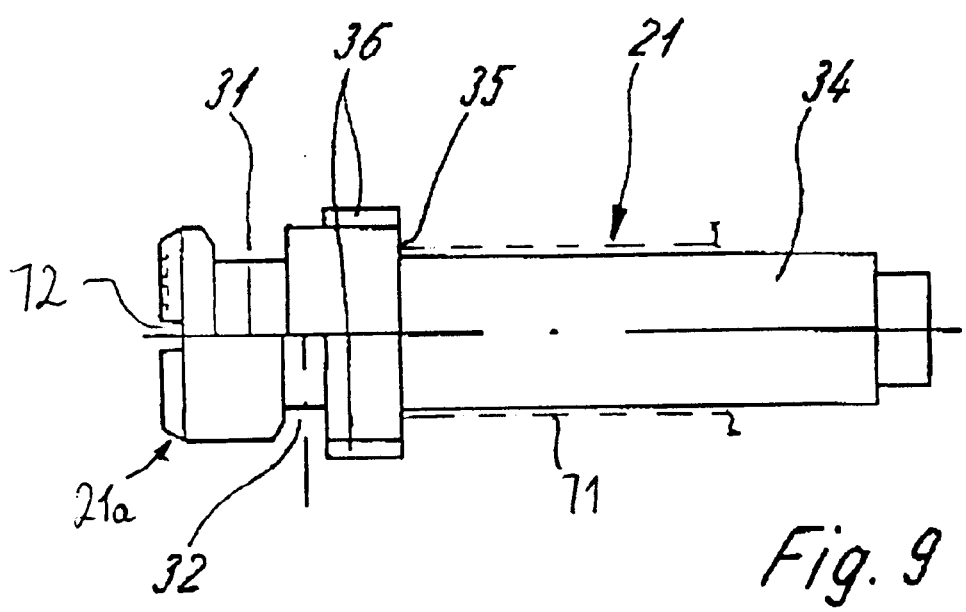
FIG. 9 is a plan view of a collared bolt for use with a joint member.

Turning now to FIG. 9, there is shown a detailed representation of the collared bolt 21 for insertion in the pocket 22 of the formed body 20. The collared bolt 21 has a head portion 21a formed with index recesses 31, 32 which are staggered in longitudinal direction and positioned relative to one another at an angular distance of 180° for realizing a form-fitting engagement of the collared bolt 21 with the post profile 10, when the head portion 21a is guided through an opening 33 (FIG. 6) into the interior chamber 10a of the post profile 10. The collared bolt 21 has a cylindrical shank 34 which supports a helical spring 71, shown only schematically. The spring 71 has one end resting against an annulus 35 disposed inwardly of the indexing recess 32 and bears with its other end against a confronting surface of the formed body 20. Disposed adjacent the annulus 35 are diametrically opposed fins 36 for respective engagement in a longitudinal slot 37 in the upper apex area of the formed body 20 and a guide groove 38 provided in the formed body 20 in opposite disposition to the longitudinal slot 37. By means of the fins 36, the collared bolt 21 can be guided in fixed rotative engagement in the pocket 22 of the formed body 20 during axial movements.

As shown for example in FIGS. 1 and 6, the formed body 20 is further provided with a transverse groove 39 for interconnecting the longitudinal slot 37 and the guide groove 38. When pushing back the collared bolt 21 in opposition to the action exerted by the spring 71, e.g. by means of a screw driver insertable in a slot 72 at the front end face of the head portion 21a, the fins 36 move into the area of the transverse groove and can then be turned for placement in the transverse groove 39. Thus, the joint member 6 can be fixed in a disposition in which the arrangement of a gasket is still possible in the connection zone.

Figure 16:
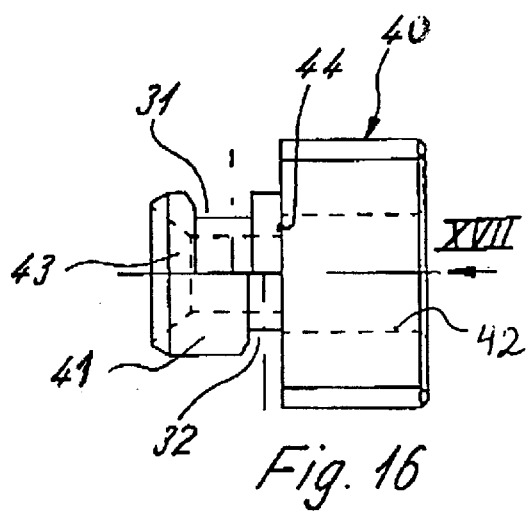
FIG. 16 is an elevational view of the joint member of FIG. 14.

Referring now to FIG. 14, there is shown a perspective view, in exploded illustration, of two T-shaped connections between crossbeam profiles 1 and a post profile 10, showing in detail yet another variation of the joint member 6 which is made of plastic material and differs from the previous embodiments by the provision of a formed body 40 in single-piece construction with a collared bolt 41. The formed body 40 and the collared bolt 41 define a central channel 42 (FIG. 17) which extends inwardly from a counterbore 43 of the collared bolt 41. Extending inwardly of the counterbore 43 are the indexing recesses 31, 32 in staggered disposition. As best seen in FIG. 16, the channel 42 has a stepped diameter so as to define a shoulder 44 for abutment of an end face of the anchoring receptacle 5 when, as shown in FIG. 15, the joint member 6 is attached to the anchoring member 70. In the area of the formed body 40, the diameter of the channel 42 corresponds to the outer contour of the anchoring receptacle 5.

Figure 17:
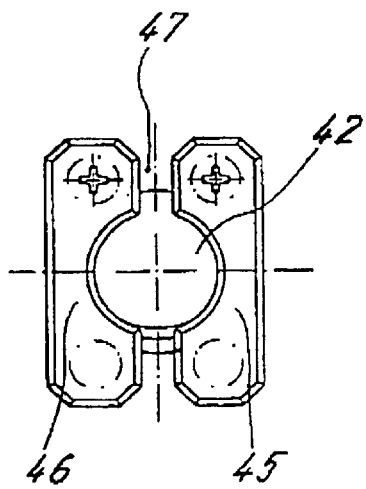
FIG. 17 is a schematic illustration of the joint member of FIG. 14, taken in the direction of arrow XVII in FIG. 16.
Figure 18:
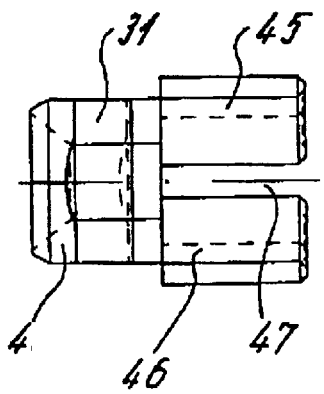
FIG. 18 is a plan view of the joint member of FIG. 14.

As shown in FIGS. 17 and 18, the formed body 40 has two fins 45, 46 which demarcate a central gap 47. The gap 47 extends across the entire structural height of the formed body 40 and has a width which corresponds to the width of the arm 4 of the crossbeam profile 1. Thus, the joint member 6 can be inverted by 180° for insertion so that the indexing recesses 31, 32 can be brought into the desired locking position to realize a form-fitting connection with the post profile 10. So long as the indexing recess 31 engages behind the edge of the opening 33 of the post profile 10, a gasket can be arranged between the crossbeam profile 1 and the post profile 10.

Securement of the single-piece joint member 6 according to FIGS. 14 to 18 to the anchoring member 70 of the crossbeam profile 1 can be realized by pushing the formed body 40 into the anchoring receptacle 5 until the end face of the anchoring receptacle 5 rests against the shoulder 44 of the formed body 40. Subsequently. a screw fastener 48 is inserted into the central channel 42 of the formed body 40 and the threaded shank of the screw fastener 48 is threaded into the anchoring receptacle 5 to thereby create a form-fitting and force-fitting engagement between the joint member 6 and the anchoring member 70.

Turning now to FIG. 3, there is shown a sectional view of a modified crossbeam profile 1 for receiving a variation of the joint member 6. Extending inwardly into the interior chamber 2 of the crossbeam profile 1 in parallel disposition to the outer wall 3 are webs 49 for defining an anchoring groove for a base plate 50 of a formed body 51 of the joint member 6. The base pate 50 can be forced into the anchoring groove at slight oversize to secure the formed body 51 against displacement in the longitudinal direction of the anchoring groove.

It is however also conceivable to provide the base plate 50 with a conicity, i.e. with a tapering toward the insertion end, with the conicity being so configured that a securement of the formed body 51 is realized in the assembled state.

A further option to realize a form-fitting and force-fitting connection can be effected by providing the base plate 50 of the formed body 51 with a bore 52, with a slot 53 terminating in the bore 52, as shown in FIG. 3, The base plate 50 of the formed body 51 is secured by threading a expansion screw (not shown) or hammering a pin (not shown) into the bore 52, thereby realizing a spreading of the formed body 51 in the base area to create the intended form-fitting and force-fitting engagement with respect to the crossbeam profile 1.

As shown in FIGS. 3.1 and 3.2, the base plate 50 may also be provided with one or more recesses 54 for ingress of material 55 of the webs 49.

Figure 4:
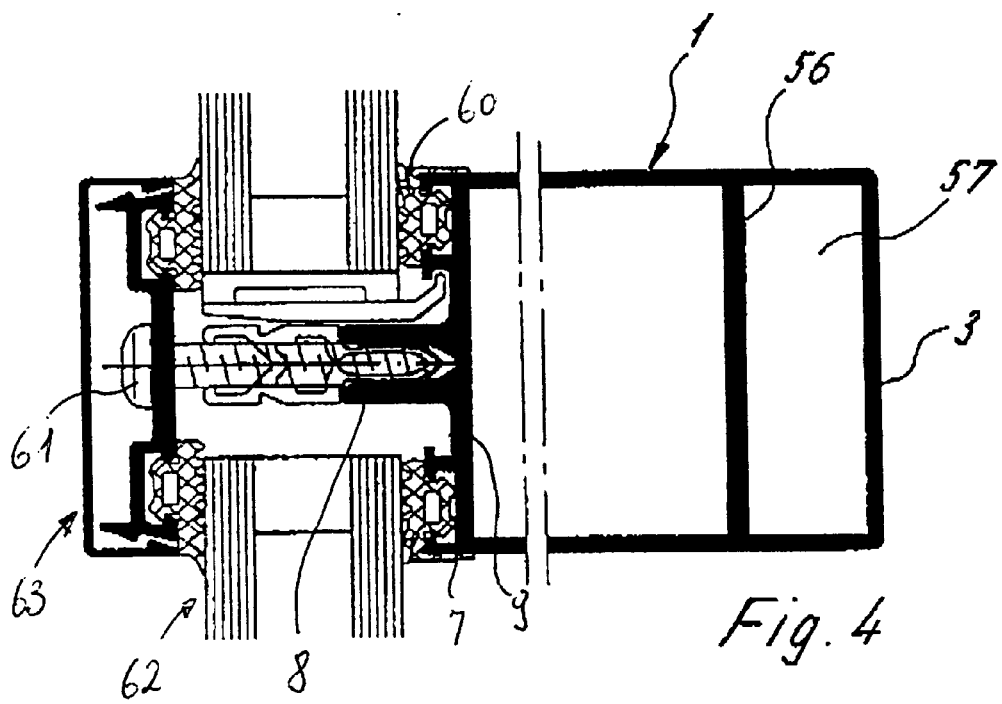
FIG. 4 is a sectional view of a third embodiment of a crossbeam profile with associated components of a glass facade.

FIG. 4 shows another embodiment of a crossbeam profile 1 which is provided interiorly in parallel disposition to the outer wall 3 with a partition 56 to thereby define a compartment 57 for securement of a joint member 6 (not shown here). The joint member 6 has an attachment foot which has a cross section corresponding to the cross section of the compartment 57 and is pushed into the compartment 57 to realize a form-fitting securement in two dimensions. The securement in the longitudinal direction of the compartment 57 can be implemented by connecting elements or by members that effect a form-fitting and/or force-fitting engagement, or by an adhesive.

Figure 5:
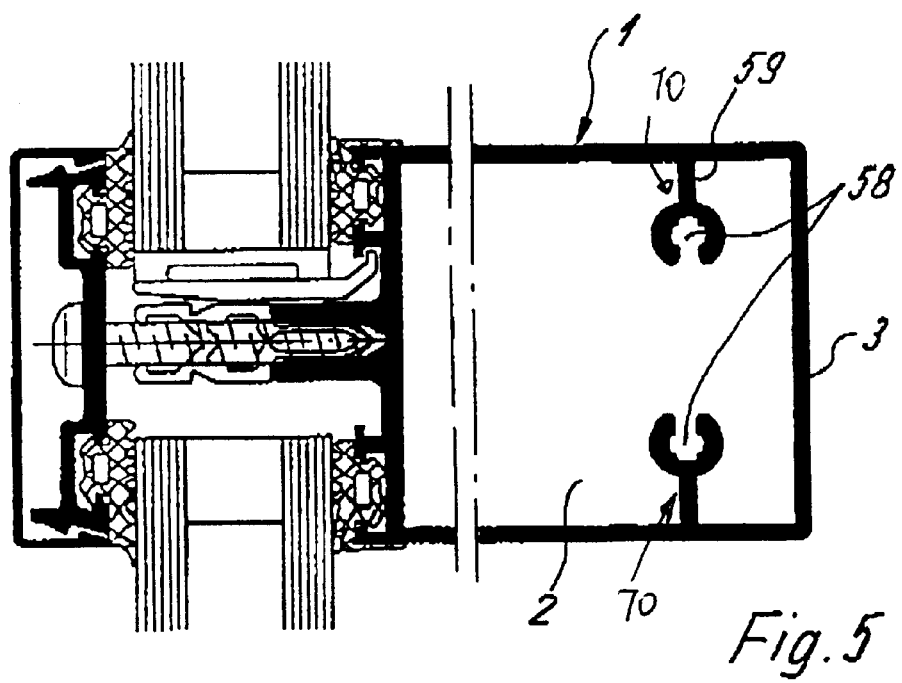
FIG. 5 is a sectional view of a fourth embodiment of a crossbeam profile with associated components of a glass facade.

FIG. 5 shows a crossbeam profile 1 with two anchoring members 70 in opposite disposition and in parallel relation to the outer wall 3. Each of the anchoring members 70 includes an arm 59 formed in one piece with an anchoring receptacle 58. The confronting anchoring receptacles 58 permit a form-fitting securement of the formed body 20 of a joint member 6, individually or commonly, without requiring fastening means being guided through the walls of the crossbeam profile 1.

While the invention has been illustrated and described as embodied in a T-shaped connection frame between two frame members of a facade or glass roof, it is not intended to be limited to the details shown since various modifications and structural changes may be made without departing in any way from the spirit of the present invention.

What is claimed as new and desired to be protected by Letters Patent is set forth in the appended claims:

1. A connection frame for a facade or glass roof, comprising:
   a first frame member having an interior chamber;
   a second frame member having an interior chamber; and
   a joint member for interconnecting the first and second frame members in the form of a T, said joint member including a formed body having an area of attachment for securement to one of the frame members via an anchoring member arranged at least adjacent a wall of the one of the frame members in parallel disposition to a glass panel plane or filler panel plane, so that the formed body extends in the interior chamber of the one of the frame members only across part of a cross section of the interior chamber of the one of the frame members at a distance to an opposite wall, wherein the formed body is configured to engage in the interior chamber of the other one of the frame members,
   wherein the anchoring member in the interior chamber of the one of the frame members includes an arm, which extends inwards from the wall, and an anchoring receptacle formed in one piece with the arm and defining a bore for receiving a fastener, said anchoring receptacle having an arm-distal side provided with a longitudinal slot, said formed body embracing the arm and the anchoring receptacle in a form-fitting manner.

2. The connection frame of claim 1 wherein the formed body is made of a material selected from the group consisting of elastic plastic material and metal.

3. The connection frame of claim 2 wherein the metal is light metal.

4. The connection frame of claim 1 wherein the fastener is a threaded pin for spreading walls of the anchoring receptacle when received in the bore to thereby secure the formed body in a force-fitting manner.

5. The connection frame of claim 4 wherein the threaded pin is formed with a conical section in proximity to its actuation end.

6. The connection frame of claim 4 wherein the formed body includes a flange which is engageable in the longitudinal slot of the anchoring receptacle and extends to the bore of the anchoring receptacle, said threaded pin impressing a thread in the flange.

7. The connection frame of claim 1 wherein the formed body includes a channel, which complements a contour of the arm and the anchoring receptacle to thereby receive the anchoring receptacle in a form-fitting manner, and a circular, central flange for engagement in the bore of the anchoring receptacle, said flange having a conical configuration in longitudinal direction and tapering in the direction toward the end of insertion.

8. The connection frame of claim 1 wherein the one of the frame members has interiorly a partition in parallel disposition to the wall for formation of a compartment for securement of the formed body.

9. The connection frame of claim 1, and further comprising a second anchoring member extending inwardly from the outer wall of the one of the frame members in opposition to the anchoring member each of the anchoring members including an arm, and an anchoring receptacle formed in one piece with the arm, said arms of the anchoring members extending parallel to the outer wall.

10. The connection frame of claim 1 wherein the formed body is formed with a collared bolt which is inserted in the formed body or formed in one piece with the formed body.

11. The connection frame of claim 1 wherein the opposite wall has a side distal to the anchoring member and formed with an anchoring groove for receiving sealing means.

12. A connection frame for a facade or glass roof, comprising:
   a first frame member having an interior chamber;
   a second frame member having an interior chamber; and
   a joint member for interconnecting the first and second frame members in the form of a T, said joint member including a formed body having an area of attachment for securement to one of the frame members via an anchoring member arranged at least adjacent a wall of the one of the frame members in parallel disposition to a glass panel plane or filler panel plane, so that the formed body extends in the interior chamber of the one of the frame members only across part of a cross section of the interior chamber of the one of the frame members at a distance to an opposite wall, wherein the formed body is configured to engage in the interior chamber of the other one of the frame members,
   wherein the formed body defines an apex formed with an upper longitudinal slot which terminates in a pocket, said connection frame including a collared bolt having a shank, which is received in the pocket, and an annulus for support of a spring circumscribing the shank.

13. The connection frame of claim 12 wherein the collared bolt is guided in fixed rotative engagement in the pocket of the formed body during displacement in axial direction.

14. The connection frame of claim 13 wherein the formed body has a lower guide groove, said bolt having fins which are received in fixed rotative engagement in the upper longitudinal slot and the lower guide groove.

15. The connection frame of claim 14 wherein the formed body is formed with a transverse groove for interconnecting the guide groove and the longitudinal slot, said fins being pivotable into the transverse groove.

16. The connection frame of claim 12 wherein the formed body is made of a material selected from the group consisting of elastic plastic material and metal.

17. The connection frame of claim 12 wherein the metal is light metal.

18. The connection frame of claim 12 wherein the one of the frame members has interiorly a partition in parallel disposition to the wall for formation of a compartment for securement of the formed body.

19. The connection frame of claim 12, and further comprising a second anchoring member extending inwardly from the outer wall of the one of the frame members in opposition to the anchoring member each of the anchoring members including an arm, and an anchoring receptacle formed in one piece with the arm, said arms of the anchoring members extending parallel to the outer wall.

20. The connection frame of claim 12 wherein the formed body is formed with a collared bolt which is inserted in the formed body or formed in one piece with the formed body.

21. The connection frame of claim 12, wherein the opposite wall has a side distal to the anchoring member and formed with an anchoring groove for receiving sealing means.

22. A connection frame for a facade or glass roof, comprising:
   a first frame member having an interior chamber;
   a second frame member having an interior chamber; and
   a joint member for interconnecting the first and second frame members in the form of a T, said joint member including a formed body having an area of attachment for securement to one of the frame members via an anchoring member arranged at least adjacent a wall of the one of the frame members in parallel disposition to a glass panel plane or filler panel plane, so that the formed body extends in the interior chamber of the one of the frame members only across part of a cross section of the interior chamber of the one of the frame members at a distance to an opposite wall, wherein the formed body is configured to engage in the interior chamber of the other one of the frame members, wherein the anchoring member includes an arm, which extends inwards from the wall, and an anchoring receptacle which is connected to the arm and defines a bore for receiving a screw fastener, said anchoring receptacle being embraced by the formed body in a form-fitting manner, said formed body being connected in one piece with a collared stud which is formed with a counterbore for a head portion of the screw fastener which has a threaded shank for engagement in a channel of the formed body.

23. The connection frame of claim 22 wherein the collared stud has an annulus for engagement upon a confronting end face of the anchoring receptacle, and fins extending from the annulus and defining a central slot which extends across an entire structural height of the formed body and has a width which is greater than a thickness of the arm.

24. The connection frame of claim 23 wherein the formed body is so configured as to be invertible by 180 degrees for insertion in the bore of the anchoring receptacle.

25. The connection frame of claim 22 wherein the formed body is made of a material selected from the group consisting of elastic plastic material and metal.

26. The connection frame of claim 22 wherein the metal is light metal.

27. The connection frame of claim 22 wherein the one of the frame members has interiorly a partition in parallel disposition to the wall for formation of a compartment for securement of the formed body.

28. The connection frame of claim 22, and further comprising a second anchoring member extending inwardly from the outer wall of the one of the frame members in opposition to the anchoring member each of the anchoring members including an arm, and an anchoring receptacle formed in one piece with the arm, said arms of the anchoring members extending parallel to the outer wall.

29. The connection frame of claim 22 wherein the formed body is formed with a collared bolt which is inserted in the formed body or formed in one piece with the formed body.

30. The connection frame of claim 22, wherein the opposite wall has a side distal to the anchoring member and formed with an anchoring groove for receiving sealing means.

31. A connection frame for a facade or glass roof, comprising:

a first frame member having an interior chamber;

a second frame member having an interior chamber; and a joint member for interconnecting the first and second frame members in the form of a T, said joint member including a formed body having an area of attachment for securement to one of the frame members via an anchoring member arranged at least adjacent a wall of the one of the frame members in parallel disposition to a glass panel plane or filler panel plane, so that the formed body extends in the interior chamber of the one of the frame members only across part of a cross section of the interior chamber of the one of the frame members at a distance to an opposite wall, wherein the formed body is configured to engage in the interior chamber of the other one of the frame members, wherein the formed body has a base plate, said one of the frame members having interiorly two webs in parallel disposition which form together with the wall of the one frame member an anchoring groove for the base plate of the formed body.

32. The connection frame of claim 31 wherein the base plate has a slight oversize with respect to the anchoring groove so that the base plate can be driven into the anchoring groove.

33. The connection frame of claim 31 wherein the base plate tapers toward an insertion end into the anchoring groove.

34. The connection frame of claim 31 wherein the formed body has a bore and a slot terminating in the bore, and further including an expansion member for engagement in the bore.

35. The connection frame of claim 31 wherein the base plate has at least one recess for ingress of material of the webs.

36. The connection frame of claim 31 wherein the formed body is made of a material selected from the group consisting of elastic plastic material and metal.

37. The connection frame of claim 31 wherein the metal is light metal.

38. The connection frame of claim 31 wherein the one of the frame members has interiorly a partition in parallel disposition to the wall for formation of a compartment for securement of the formed body.

39. The connection frame of claim 31, and further comprising a second anchoring member extending inwardly from the outer wall of the one of the frame members in opposition to the anchoring member each of the anchoring members including an arm, and an anchoring receptacle formed in one piece with the arm, said arms of the anchoring members extending parallel to the outer wall.

40. The connection frame of claim 31 wherein the formed body is formed with a collared bolt which is inserted in the formed body or formed in one piece with the formed body.

41. The connection frame of claim 31, wherein the opposite wall has a side distal to the anchoring member and formed with an anchoring groove for receiving sealing means.

\* \* \* \* \*